(12) United States Patent
Lu et al.

(10) Patent No.: US 9,134,855 B2
(45) Date of Patent: Sep. 15, 2015

(54) POSITIONING MODULE, OPTICAL TOUCH SYSTEM AND METHOD OF CALCULATING A COORDINATE OF A TOUCH MEDIUM

(71) Applicant: PixArt Imaging Inc., Hsin-Chu (TW)

(72) Inventors: Chun-Yi Lu, Hsin-Chu (TW); Hsin-Chi Cheng, Hsin-Chu (TW); Yu-Chia Lin, Hsin-Chu (TW); Chun-Sheng Lin, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/848,720

(22) Filed: Mar. 21, 2013

(65) Prior Publication Data
US 2014/0146016 A1   May 29, 2014

(30) Foreign Application Priority Data
Nov. 29, 2012   (TW) .............................. 101144727 A (51) Int. Cl.
*G06F 3/042* (2006.01)

(52) U.S. Cl.
CPC .................................... *G06F 3/0421* (2013.01)

(58) Field of Classification Search
CPC ..... G06F 3/0421; G06F 3/042; G06F 3/0428; G06F 3/0425; G02F 1/13338
USPC .................. 345/156, 165, 175, 179; 250/221, 250/206.1; 178/19.05
See application file for complete search history.

(56) References Cited

U.S. PATENT DOCUMENTS

| | | | |
|---|---|---|---|
| 6,791,700 B2* | 9/2004 | Omura et al. ................. | 356/620 |
| 7,006,236 B2* | 2/2006 | Tomasi et al. ................. | 356/614 |
| 7,050,177 B2* | 5/2006 | Tomasi et al. ................. | 356/614 |
| 7,689,381 B2* | 3/2010 | Lin et al. ........................ | 702/151 |
| 8,180,114 B2* | 5/2012 | Nishihara et al. ............. | 382/114 |
| 8,436,834 B2* | 5/2013 | Cheng et al. .................. | 345/175 |
| 8,610,693 B2* | 12/2013 | Onishi ......................... | 345/175 |
| 8,624,877 B2* | 1/2014 | Lai et al. ....................... | 345/175 |
| 8,675,913 B2* | 3/2014 | Chen et al. .................... | 382/103 |
| 8,717,315 B2* | 5/2014 | Kao et al. ...................... | 345/173 |
| 2002/0024676 A1* | 2/2002 | Fukuzaki ....................... | 356/623 |
| 2003/0218760 A1* | 11/2003 | Tomasi et al. ................. | 356/614 |

(Continued)

FOREIGN PATENT DOCUMENTS

| | | |
|---|---|---|
| TW | 201112091 | 4/2011 |
| TW | 201137704 | 11/2011 |

(Continued)

*Primary Examiner* — Lun Yi Lao
*Assistant Examiner* — Peter D McLoone
(74) *Attorney, Agent, or Firm* — Winston Hsu; Scott Margo (57) ABSTRACT

A positioning module of calculating a coordinate of a touch medium is disclosed in the present invention. The positioning module includes at least one image detecting unit, a first light source, a second light source and a processor. The image detecting unit includes a lateral side and an upper side. The image detecting unit captures an image reflected from a reflection component. The first light source is disposed on the lateral side and outputs a first beam. The second light source is disposed on the upper side and outputs a second beam. The processor is electrically connected to the image detecting unit. The processor determines a touch status of the touch medium according to a first image generated by the first beam, and further determines a touch coordinate of the touch medium according to a second image generated by the second beam.

22 Claims, 4 Drawing Sheets

(56) References Cited

U.S. PATENT DOCUMENTS

| | | | |
|---|---|---|---|
| 2003/0218761 A1* | 11/2003 | Tomasi et al. | 356/627 |
| 2009/0090569 A1* | 4/2009 | Lin | 178/18.09 |
| 2010/0010773 A1* | 1/2010 | Lin et al. | 702/152 |
| 2010/0156820 A1* | 6/2010 | Lin et al. | 345/173 |
| 2011/0018822 A1* | 1/2011 | Lin et al. | 345/173 |
| 2011/0032215 A1* | 2/2011 | Sirotich et al. | 345/175 |
| 2011/0052007 A1* | 3/2011 | Chen et al. | 382/103 |
| 2011/0061950 A1* | 3/2011 | Cheng et al. | 178/18.09 |
| 2011/0063253 A1* | 3/2011 | Kiyose | 345/175 |
| 2011/0080363 A1* | 4/2011 | Kao et al. | 345/173 |
| 2011/0116104 A1* | 5/2011 | Kao et al. | 356/621 |
| 2011/0193969 A1* | 8/2011 | Tsai et al. | 348/169 |
| 2011/0234542 A1* | 9/2011 | Marson | 345/175 |
| 2011/0261016 A1* | 10/2011 | Huang | 345/175 |
| 2011/0279413 A1* | 11/2011 | Lai et al. | 345/175 |
| 2012/0249418 A1* | 10/2012 | Onishi | 345/156 |
| 2012/0262423 A1* | 10/2012 | Su et al. | 345/175 |
| 2013/0135255 A1* | 5/2013 | Gally et al. | 345/175 |
| 2013/0264462 A1* | 10/2013 | Huang et al. | 250/206.1 |
| 2014/0091200 A1* | 4/2014 | Cheng | 250/206.1 |
| 2014/0098062 A1* | 4/2014 | Lin et al. | 345/175 |
| 2014/0104238 A1* | 4/2014 | Lu | 345/175 |
| 2014/0146019 A1* | 5/2014 | Lin et al. | 345/175 |

FOREIGN PATENT DOCUMENTS

| | | |
|---|---|---|
| TW | 201140401 | 11/2011 |
| TW | 201145116 | 12/2011 |
| TW | 201201078 | 1/2012 |

* cited by examiner

POSITIONING MODULE, OPTICAL TOUCH SYSTEM AND METHOD OF CALCULATING A COORDINATE OF A TOUCH MEDIUM

BACKGROUND OF THE INVENTION

1. Field of the Invention

The present invention relates to a positioning module, an optical touch system and a method of calculating coordinates of the touch medium, and more particularly, to a positioning module, an optical touch system and a method of calculating coordinates of the touch medium that can actuate the coordinate calculation when the touch medium contacts a touching panel.

2. Description of the Prior Art

A light source of the conventional optical touch module is disposed above the optical detector, the optical shelter path can be effective when an object is put into a projecting range of the light source, and the optical touch module can calculate the correct position of the object. However, position of the light source is higher than position of the camera of the optical detector. Beam emitted from the light source is shadowed by the object before the object contacts the touch plane, and the optical detector is actuated to detect motion of the object when the object does not contact the touch plane. As the light source and the optical detector are disposed on the same perpendicular plane, a dark area, which is formed when the beam emitted from the light source is shadowed by the object, is deviated because the optical detector misaligns with an optical path from the light source to the object, so that the optical detector can not calculate the correct position of the object according to the captured image. Thus, design of an optical touch system capable of actuating the coordinate calculation when the object contacts or almost contacts the touch plane for correct position of the object is an important issue in the optical touch industry.

SUMMARY OF THE INVENTION

The present invention provides a positioning module, an optical touch system and a method of calculating coordinates of the touch medium that can actuate the coordinate calculation when the touch medium contacts a touching panel for solving above drawbacks.

According to the claimed invention, a positioning module for calculating coordinates of a touch medium is disclosed. The positioning module includes at least one image detecting unit, a first light source, a second light source and a processor. The image detecting unit includes a lateral side and an upper side. The first light source is disposed on the lateral side for emitting a first beam. The second light source is disposed on the upper side for emitting a second beam. The processor is electrically connected to the image detecting unit. The processor determines a touch status of the touch medium according to a first image generated by the first beam, and further determines a touch position of the touch medium according to a second image generated by the second beam.

According to the claimed invention, an optical touch system for calculating coordinates of a touch medium is disclosed. The optical touch system includes a panel and a positioning module. The positioning module is disposed on the panel. The positioning module includes at least one image detecting unit, a first light source, a second light source and a processor. The image detecting unit includes a lateral side and an upper side. The first light source is disposed on the lateral side for emitting a first beam. The second light source is disposed on the upper side for emitting a second beam. The processor is electrically connected to the image detecting unit. The processor determines a touch status of the touch medium according to a first image generated by the first beam, and further determines a touch position of the touch medium according to a second image generated by the second beam.

According to the claimed invention, a method of calculating coordinates of a touch medium is disclosed. The method includes emitting a first beam, emitting a second beam, receiving a first image generated by the first beam, determining a touch status of the touch medium according to the first image, receiving at least one second image generated by the second beam, and determining a touch position of the touch medium according to the second image.

The optical touch system of the present invention can prevent the coordinate calculation from error because the touch medium does not contact the panel, and can rapidly acquire the coordinates of the touch medium relative to the panel for enhancement of the positioning speed and calculating accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
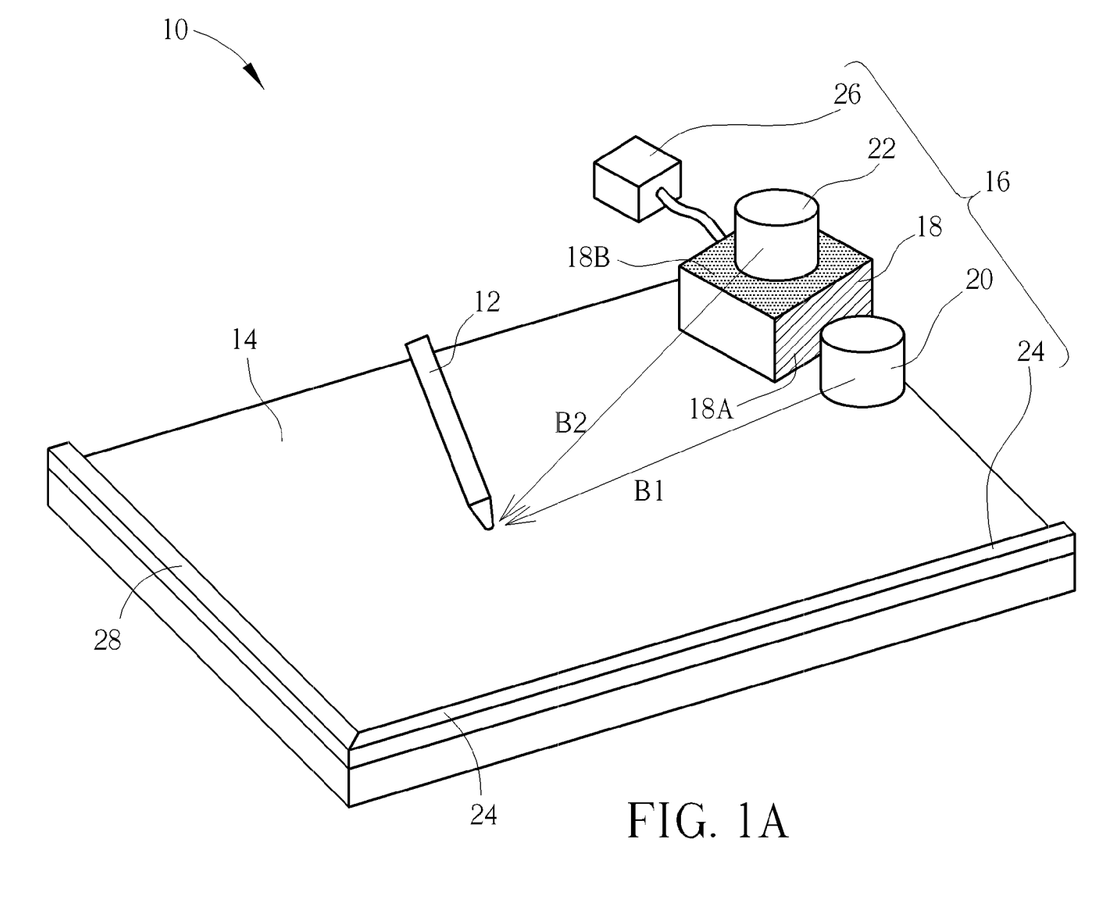
FIG. 1A is a diagram of an optical touch system according to an embodiment of the present invention.

Please refer to FIG. 1A. FIG. 1A is a diagram of an optical touch system 10 according to an embodiment of the present invention. A touch medium 12 can be utilized to draw a track, and the optical touch system 10 can detect coordinates of the touch medium 12 so as to output the corresponding operation command according to the coordinate variation. The optical touch system 10 includes a panel 14 and a positioning module 16. The touch medium 12 can move on a surface of the panel 14. The positioning module 16 is disposed on the panel 14 for calculating the coordinates of the touch medium 12. Generally, the touch medium 12 can be user's finger or the stylus.

As shown in FIG. 1A, the positioning module 16 includes at least one image detecting unit 18, a first light source 20, a second light source 22, a reflection component 24 and a processor 26. The reflection component 24 is disposed on at least one side of the panel 14. The image detecting unit 18, the first light source 20 and the second light source 22 are disposed on the other side of the panel 14 relative to the reflection component 24. The first light source 20 and the second light source 22 respectively emit a first beam B1 and a second beam B2. The first beam B1 and the second beam B2 are reflected by the reflection component 24 to project on the image detecting unit 18, so as to generate the corresponding first image and the corresponding second image. A mirror component 28 can be disposed on the side of the panel 14 opposite to the image detecting unit 18, and the image detecting unit 18 can simultaneously capture a real image and a virtual image of the touch medium 12 for coordinate calculation. The image detecting unit 18 includes a lateral side 18A (the slash area) and an upper side 18B (the dotted area). The first light source 20 is disposed on the lateral side 18A, and the second light source 22 is disposed on the upper side 18B.

Figure 1B:
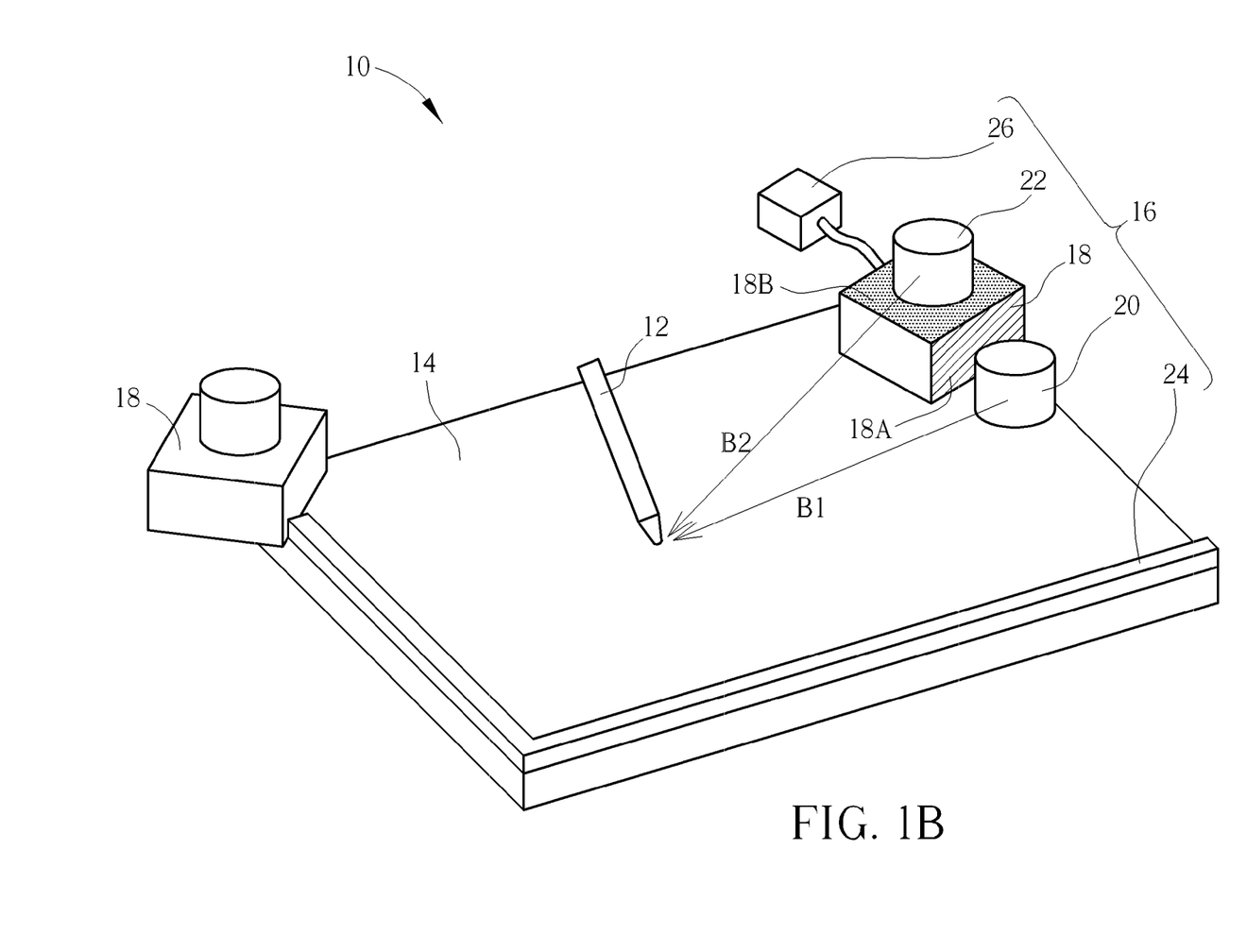
FIG. 1B is a diagram of the optical touch system according to the other embodiment of the present invention.

The positioning module 16 can further include a plurality of image detecting units 18 respectively disposed on corners or sides of the panel 14, as shown in FIG. 1B. The light source is disposed on the upper side of each image detecting unit 18. FIG. 1B is a diagram of the optical touch system 10 according to the other embodiment of the present invention. The positioning module 16 can utilize image positions of the touch medium 12 projected on the image detecting units 18 to calculate the coordinates by triangulation method. An amount and disposition of the image detecting unit 18 is not limited to the above-mentioned embodiment, and depend on design demand.

In addition, the processor 26 is electrically connected to the image detecting unit 18. The processor 26 can determine a touch status of the touch medium 12 relative to the panel 14 according to the first image generated by the image detecting unit 18. The first beam B1 is shadowed when the touch medium 12 moves into detection range of the positioning module 16. A part of the first beam B1 is shadowed to generate a first dark area on the reflection component 24. The image detecting unit 18 can capture the first image with the first dark area. Then, the processor 26 analyzes an intensity of the first dark area on the first image to determine the touch status of the touch medium 12 relative to the panel 14. The first dark area may cover one or more columns. A comparing threshold can further be set for determining whether the first dark area is generated. For example, the present invention can set the comparing threshold as three columns, so that the shadowed image with dimensions smaller than three columns does not belong to the first dark area.

The processor 26 compares an intensity of the first image to a threshold value, and determined whether the touch medium 12 contacts the panel 14 according to a comparison. The intensity of the first image includes a plurality of intensity magnitudes, and each intensity magnitude corresponds to a typical value of the each column of the first image. The threshold value includes a plurality of threshold magnitudes, and these threshold magnitudes respectively correspond to intensity thresholds of a plurality of columns of the first image. When the intensity magnitude of one column of the first image is lower than the corresponding intensity thresholds, the column can be within the first dark area of the first image. The processor 26 can determine that the touch medium 12 has contacted the panel 14 according to the intensity magnitude of the first dark area.

The processor 26 further can determine a touch position of the touch medium 12 on the panel 14 according to the second image captured by the image detecting unit 18. When the touch medium 12 is put on the panel 14, a part of the second beam B2 is shadowed by the touch medium 12, and a second dark area is formed on the reflection component 24. Then, the processor 26 can compare a plurality of intensity magnitudes of the second image to the at least one threshold value, so as to find out the imaging position of the second dark area on the second image, and to determine the touch position of the touch medium 12 on the panel 14 (which means the coordinates of the touch medium 12 can be calculated). The second dark area may cover one or more columns. A comparing threshold can further be set for determining whether the second dark area is generated. For example, the present invention can set the comparing threshold as three columns, so that the shadowed image with dimensions smaller than three columns does not belong to the second dark area.

As shown in FIG. 1A, the first light source 20 is disposed on the lateral side 18A, the second light source 22 is disposed on the upper side 18B, so that a distance between the first light source 20 and the surface of the panel 14 (the plane where the touch medium 12 moves) is substantially smaller than a distance between the second light source 22 and the surface of the panel 14. Regards to the panel 14, the first light source 20 shares the same vertical position with the image detecting unit 18, and the second light source 22 shares the same horizontal position with the image detecting unit 18. When the touch medium 12 moves into the detection range of the positioning module 16, the processor 26 drives the image detecting unit 18 to capture the first image, and determines the touch status according to the intensity of the first dark area on the first image. As the touch medium 12 contacts the panel 14 (or a distance between the touch medium 12 and the panel 14 is smaller than a predetermined value), the processor 26 can start the analysis of the second image, so as to calculate the touch position (the coordinates) of the touch medium 12 on the panel 14.

It should be mentioned that the processor 26 can be electrically connected to the first light source 20 and the second light source 22, selectively. The processor 26 can respectively actuate the image detecting unit 18, the first light source 20 and the second light source 22. The image detecting unit 18 is actuated to respectively capture the first image and the second image, and the processor 26 can analyze the first image and the second image to determine the touch status and the touch position. For energy consumption of the positioning module 16, the processor 26 can control the first light source 20 and the second light source 22 to respectively output the first beam B1 and the second beam B2. Emitting period of the first light source 20 and the second light source 22 can be different. As the positioning module 16 includes the plurality of image detecting units 18, the first light source 20 and the second light source 22 can simultaneously or respectively emit the beams. In an energy saving mode, the processor 26 can actuate the first light source 20 to generate the first image, analyze the first image, shut down the first light source 20 when the touch medium 12 contacts the panel 14, and then actuate the second light source 22 to generate the second image. Therefore, the present invention not only can effectively calculate the correct touch position of the touch medium 12 on the panel 14, but also can economize the energy of the light sources.

Figure 2:
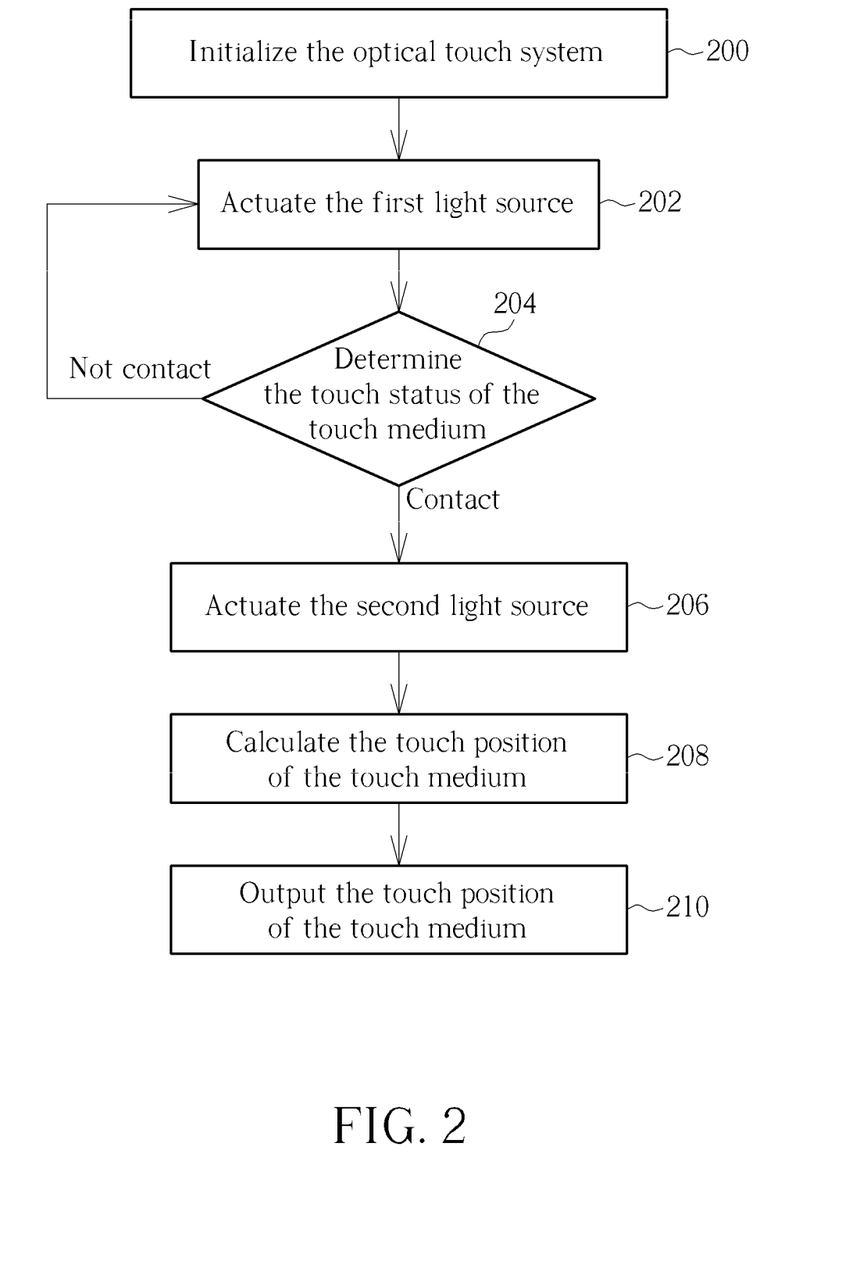
FIG. 2 is a flow chart of calculating the coordinates of a touch medium according to a first embodiment of the present invention.

Please refer to FIG. 2. FIG. 2 is a flow chart of calculating the coordinates of the touch medium 12 according to a first embodiment of the present invention. The method of calculating the coordinates of the touch medium 12 shown in FIG. 2 is applied to the optical touch system 10 shown in FIG. 1A. First, step 200 is executed to initialize the optical touch system 10. Then, step 202 is executed to actuate the first light source 20. The first light source 20 emits the first beam B1, and the first beam B1 is reflected by the reflection component 24 to project the first image on the image detecting unit 18. Then, step 204 is executed to determine the touch status of the touch medium 12. When the touch medium 12 is put on the panel 14, a part of the first beam B1 is shadowed by the touch medium 12 to generate the first dark area, so the first image captured by the image detecting unit 18 has the first dark area. The processor 26 can compare the intensity of the first dark area on the first image to the threshold value, and determine whether the touch medium 12 contacts the panel 14. As the intensity is greater than the threshold value, the touch medium 12 does not contact the panel 14 and step 202 is executed. As the intensity is smaller than the threshold value, the touch medium 12 contacts the panel 14, and step 206 is executed to actuate the second light source 22. Meanwhile, the first light source 20 can be selectively shut down for the energy economy.

The second light source 22 can emit the second beam B2. The second beam B2 is reflected by the reflection component 24 to project the second image on the image detecting unit 18. Because the touch medium 12 is put on the panel 14, the part of the second beam B2 is shadowed by the touch medium 12 to generate the second dark area. Then, step 208 is executed to calculate the position of the touch medium 12. The processor 26 can calculate the touch position (the coordinates) of the touch medium 12 on the panel 14 according to the position of the second dark area on the second image. Step 210 is executed to output the coordinates of the touch medium 12 on the panel 14 by the processor 26, so as to be the control command to execute the corresponding application program. Meanwhile, the second light source 22 can be shut down. After output of the coordinates, the positioning module 16 finishes the touch detection, and step 202 is executed again to actuate the first light source 20 for driving the image detecting unit 18 to capture the first image, and to drive the processor 26 to determine the touch status of the touch medium 12 at next phase according to the first image.

Figure 3:
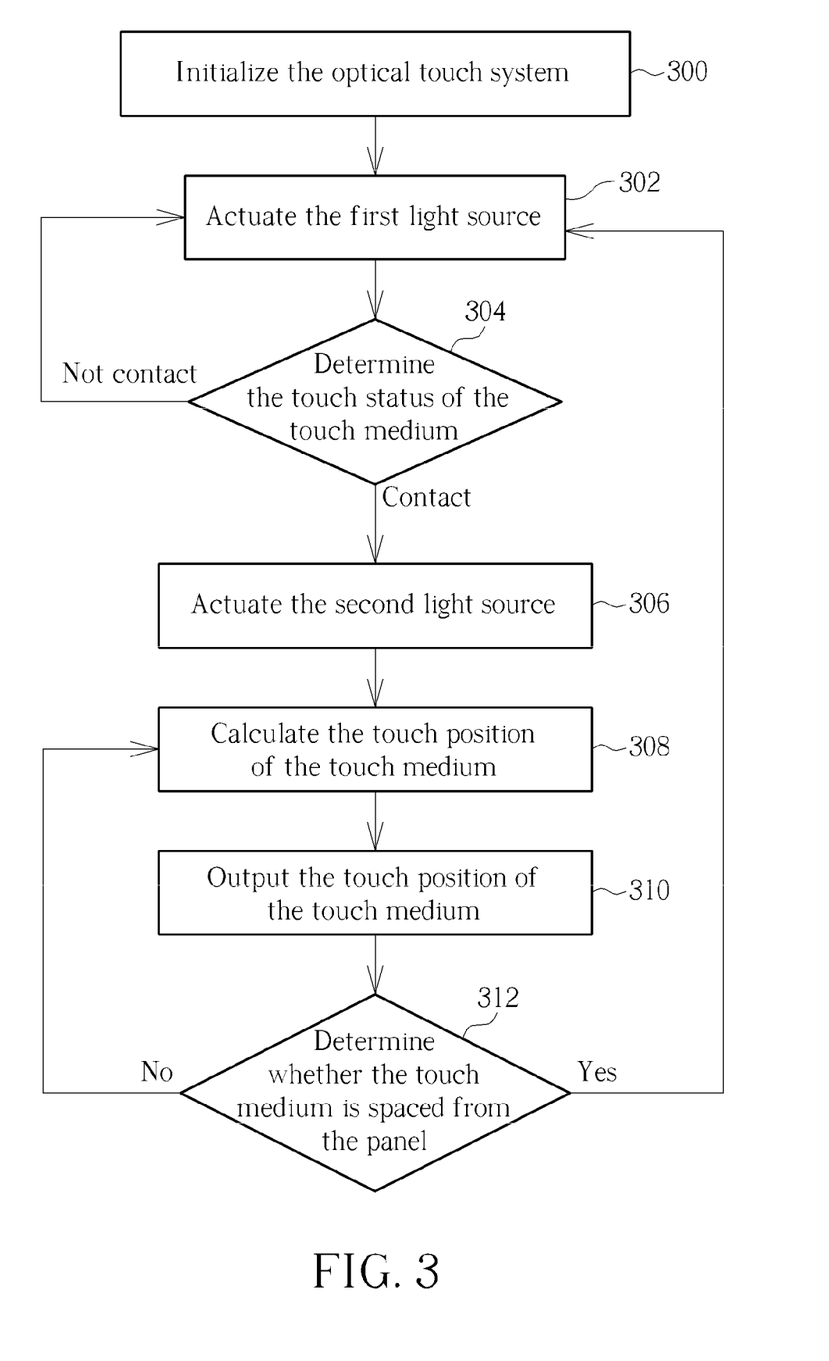
FIG. 3 is a flow chart of calculating the coordinates of the touch medium according to a second embodiment of the present invention.

Please refer to FIG. 3. FIG. 3 is a flow chart of calculating the coordinates of the touch medium 12 according to a second embodiment of the present invention. The method of calculating the coordinates of the touch medium 12 shown in FIG. 3 is applied to the optical touch system 10 shown in FIG. 1A. Steps 300-310 for calculating the coordinates of the touch medium 12 in the second embodiment are substantially the same as steps 200-210 mentioned in the first embodiment. The other energy saving mode is disclosed in the second embodiment. Difference between the second embodiment and the first embodiment is that method in the second embodiment can execute step 312 after the coordinates of the touch medium 12 is outputted, so as to determine whether the touch medium 12 is spaced from the panel 14. As the touch medium 12 is not spaced from the panel 14, the image detecting unit 18 can capture the second image for the second time, and the processor 26 can analyze the imaging position of the second dark area to calculate the touch position of the touch medium 12 at the next phase. As the touch medium 12 is spaced from the panel 14, the processor 26 can shut down the second light source 22 and actuate the first light source 20, and drive the image detecting unit 18 to capture the first image. The processor 26 can analyze the first dark area on the captured first image to determine the touch status of the touch medium 12 at the next phase.

For the energy economy, step 312 is the second embodiment discloses that the processor 26 compares the intensity of the second image to the threshold value. When the intensity are greater than the corresponding threshold value, the second dark area is disappeared, which means the touch medium 12 is spaced from the panel 14, so that step 302 is executed to actuate detection of the touch status of the touch medium 12. When at least one of the intensity is lower than the corresponding threshold value, the second dark area exists because the second beam B2 is shadowed by the touch medium 12, which means the touch medium 12 is within the detection range of the positioning module 16, and the touch medium 12 is not spaced from the panel 14, so that step 308 is executed to calculate the touch position of the touch medium 12 at the next phase.

In the first embodiment, the processor 26 actuates the detection of the touch status of the touch medium 12 after the processor 26 outputs the touch position of the touch medium 12, so as to calculate all coordinates of the touch medium 12 when the touch medium 12 moves through the panel 12. The processor 26 repeatedly actuates the detection of the touch status of the touch medium 12 regardless of position of the touch medium 12 relative to the positioning module 16 (the touch medium 12 may be inside or outside the detection range of the positioning module 16), so as to ensure that the positioning module 16 can catch every position of the touch medium 12 when the touch medium 12 moves over the panel 12. In the second embodiment, the processor 26 can determine whether the touch medium 12 is spaced from the panel 12 after the processor 26 outputs the last touch position of the touch medium 12. As the touch medium 12 is not spaced from the panel 14, the positioning module 16 can utilize the processor 26 to immediately analyze the second image captured by the image detecting unit 18, so as to calculate the touch position of the touch medium 12 at the present phase. Therefore, the optical touch system 10 of the present invention can utilize the method shown in FIG. 2 to increase calculation speed of the coordinate detection and to economize the energy consumption of the first light source 20.

In conclusion, the optical touch system of the present invention utilizes the two light sources disposed on different positions, so that the positioning module can detect whether the touch medium contacts the panel in advance, and then execute the coordinate calculation when the touch medium has contacted the panel. The present invention not only can calculate the correct coordinates of the touch medium on the panel, but also can save the energy of light sources. The first light source disposed on the lateral side of the image detecting unit can generate the first dark area when the touch medium contacts the panel. The positioning module compares the intensity of the first dark area to the threshold value, and determines the touch status of the touch medium relative to the panel. The second light source disposed on the upper side of the image detecting unit can be actuated after the touch medium contacts the panel, and the positioning module can calculate the touch position of the touch medium on the panel accurately. Thus, the optical touch system of the present invention can prevent the coordinate calculation from error because the touch medium does not contact the panel, and can rapidly acquire the coordinates of the touch medium relative to the panel for enhancement of the positioning speed and calculating accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A positioning module for calculating coordinates of a touch medium, the positioning module comprising:
   at least one image detecting unit, the image detecting unit comprising a bottom side, a lateral side and an upper side, the bottom side being opposite to the upper side and the lateral side being connected between the bottom side and the upper side, the bottom side of the image detecting unit being disposed on a panel;
   a first light source disposed on the panel whereon the bottom side is disposed, and the first light source being adjacent to the lateral side for emitting a first beam;
   a second light source disposed on the upper side for emitting a second beam, wherein an angle between the panel and a projection direction of the second light source is greater than an angle between the panel and a projection direction of the first light source; and a processor electrically connected to the image detecting unit, the processor determining a touch status of the touch medium according to a first image generated by the first beam, and further determining a touch position of the touch medium according to a second image generated by the second beam, wherein the first light source and the second light source are respectively actuated by the processor, the processor actuates the first light source to generate the first image, and determines whether the second light source is actuated to generate the second image according to the touch status by analyzing the first image.

2. The positioning module of claim 1, wherein the first beam is reflected by a reflection component to project the first image on the image detecting unit, the second beam is reflected by the reflection component to project the second image on the image detecting unit.

3. The positioning module of claim 2, wherein the image detecting unit detects a first dark area generated on the reflection component because a part of the first beam is shadowed by the touch medium, and determines the touch status according to an intensity of the first dark area on the first image.

4. The positioning module of claim 3, wherein the image detecting unit determines that the touch medium contacts the panel when the intensity of the first dark area on the first image is lower than a threshold value.

5. The positioning module of claim 2, wherein the image detecting unit detects a second dark area generated on the reflection component because a part of the second beam is shadowed by the touch medium, and determines the touch position according to a position of the second dark area on the second image.

6. The positioning module of claim 1, wherein a distance between the first light source and a surface of the panel is substantially smaller than a distance between the second light source and the surface of the panel.

7. The positioning module of claim 4, wherein the intensity of the first image comprises a plurality of intensity magnitudes, and each intensity magnitude corresponds to a typical value of the each column of the first image.

8. The positioning module of claim 4, wherein the threshold value comprises a plurality of threshold magnitudes, and the threshold magnitudes respectively correspond to intensity thresholds of a plurality of columns of the first image.

9. An optical touch system for calculating coordinates of a touch medium, the optical touch system comprising:
  a panel; and
  a positioning module disposed on the panel, the positioning module comprising:
    at least one image detecting unit, the image detecting unit comprising a bottom side, a lateral side and an upper side, the bottom side being opposite to the upper side and the lateral side being connected between the bottom side and the upper side, the bottom side of the image detecting unit being disposed on the panel;
    a first light source disposed on the panel whereon the bottom side is disposed, and the first light source being adjacent to the lateral side for emitting a first beam;
    a second light source disposed on the upper side for emitting a second beam, wherein an angle between the panel and a projection direction of the second light source is greater than an angle between the panel and a projection direction of the first light source; and
    a processor electrically connected to the image detecting unit, the processor determining a touch status of the touch medium according to a first image generated by the first beam, and further determining a touch position of the touch medium according to a second image generated by the second beam, wherein the first light source and the second light source are respectively actuated by the processor, the processor actuates the first light source to generate the first image, and determines whether the second light source is actuated to generate the second image according to the touch status by analyzing the first image.

10. The optical touch system of claim 9, wherein the first beam is reflected by a reflection component to project the first image on the image detecting unit, the second beam is reflected by the reflection component to project the second image on the image detecting unit.

11. The optical touch system of claim 10, wherein the image detecting unit detects a first dark area generated on the reflection component because a part of the first beam is shadowed by the touch medium, and determines the touch status according to an intensity of the first dark area on the first image.

12. The optical touch system of claim 11, wherein the image detecting unit determines that the touch medium contacts the panel when the intensity of the first dark area on the first image is lower than a threshold value.

13. The optical touch system of claim 10, wherein the image detecting unit detects a second dark area generated on the reflection component because a part of the second beam is shadowed by the touch medium, and determines the touch position according to a position of the second dark area on the second image.

14. The optical touch system of claim 9, wherein a distance between the first light source and a surface of the panel is substantially smaller than a distance between the second light source and the surface of the panel.

15. The optical touch system of claim 12, wherein the intensity of the first image comprises a plurality of intensity magnitudes, and each intensity magnitude corresponds to a typical value of the each column of the first image.

16. The optical touch system of claim 12, wherein the threshold value comprises a plurality of threshold magnitudes, and the threshold magnitudes respectively correspond to intensity thresholds of a plurality of columns of the first image.

17. A method of calculating coordinates of a touch medium, the method being applied to a positioning module disposed on a panel, the positioning module comprising at least one image detecting unit, the image detecting unit comprising a bottom side, a lateral side and an upper side, the bottom side being opposite to the upper side and the lateral side being connected between the bottom side and the upper side, the bottom side of the image detecting unit being disposed on the panel, the method comprising:
  emitting a first beam by a first light source disposed on the panel whereon the bottom side is disposed and adjacent to the lateral side;
  emitting a second beam by a second light source disposed on the upper side, wherein an angle between the panel and a projection direction of the second light source is greater than an angle between the panel and a projection direction of the first light source;
  receiving a first image generated by the first beam;
  determining a touch status of the touch medium according to the first image;
  receiving at least one second image generated by the second beam;

determining a touch position of the touch medium according to the second image; and determining whether the second beam is emitted to generate the second image according to the touch status by analyzing the first image.

18. The method of claim 17, further comprising:

reflecting the first beam to an image detecting unit by a reflection component to generate the first image; and reflecting the second beam to the image detecting unit by the reflection component to generate the second image.

19. The method of claim 18, further comprising:

detecting a first dark area generated on the reflection component because a part of the first beam is shadowed; and determining the touch status according to an intensity of the first dark area on the first image.

20. The method of claim 19, further comprising:

determining that the touch medium contacts the panel when the intensity of the first dark area on the first image is lower than a threshold value.

21. The method of claim 18, further comprising:

detecting a second dark area generated on the reflection component because a part of the second beam is shadowed; and determining the touch position according to a position of the second dark area on the second image.

22. The method of claim 20, further comprising:

comparing intensity magnitudes of the second image to the threshold value; and determining that the touch medium does not contact the panel when the intensity of the second image is greater than the threshold value.

\* \* \* \* \*